US009002856B2

(12) United States Patent
Minogue et al.

(10) Patent No.: US 9,002,856 B2
(45) Date of Patent: Apr. 7, 2015

(54) AGENT RANK

(75) Inventors: David Minogue, Palo Alto, CA (US); Paul A. Tucker, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/198,967

(22) Filed: Aug. 5, 2011

(65) Prior Publication Data

US 2011/0289095 A1  Nov. 24, 2011

Related U.S. Application Data

(63) Continuation of application No. 13/105,326, filed on May 11, 2011, now Pat. No. 8,296,293, which is a continuation of application No. 12/506,395, filed on Jul. 21, 2009, now Pat. No. 8,224,826, which is a continuation of application No. 11/200,406, filed on Aug. 8, 2005, now Pat. No. 7,565,358.

(51) Int. Cl.
 *G06F 17/30* (2006.01)
 *G06Q 10/06* (2012.01)

(52) U.S. Cl.
 CPC .... *G06F 17/30864* (2013.01); *G06Q 10/06398* (2013.01)

(58) Field of Classification Search
 CPC ............... G06F 17/30864; G06Q 10/06398; G06Q 30/0263; G06Q 30/0641; G06Q 30/0633; G06Q 30/0603; H06L 63/20; H04N 21/2385; H04L 65/403
 USPC .............. 707/748, 805, E17.044, 747, 723, 707/E17.107, E17.014; 715/234, 237, 753, 715/206; 709/220, 226, 206, 207; 713/161, 713/169, 176, 180, 158, 186; 726/22, 23, 726/24, 25; 463/1, 31, 42; 705/14.6, 51, 52, 705/53, 54, 55–59
 See application file for complete search history.

(56) References Cited

U.S. PATENT DOCUMENTS

| | | | | |
|---|---|---|---|---|
| 5,371,673 A | * | 12/1994 | Fan | 704/1 |
| 5,557,518 A | * | 9/1996 | Rosen | 705/69 |
| 5,559,895 A | | 9/1996 | Lee et al. | |
| 5,561,282 A | | 10/1996 | Price et al. | |
| 5,659,616 A | | 8/1997 | Sudia | |

(Continued)

FOREIGN PATENT DOCUMENTS

| | | |
|---|---|---|
| EP | 1363208 A3 | 4/2006 |
| WO | WO0062220 A1 | 10/2000 |

OTHER PUBLICATIONS

C Ferris—Standard, W3C World, 2004—w3.org—"Web services architecture"—Feb. 11, 2004 pp. 1-98.*

(Continued)

*Primary Examiner* — Anh Ly
(74) *Attorney, Agent, or Firm* — Fish & Richardson P.C.

(57) ABSTRACT

The present invention provides methods and apparatus, including computer program products, implementing techniques for searching and ranking linked information sources. The techniques include receiving multiple content items from a corpus of content items; receiving digital signatures each made by one of multiple agents, each digital signature associating one of the agents with one or more of the content items; and assigning a score to a first agent of the multiple agents, wherein the score is based upon the content items associated with the first agent by the digital signatures.

17 Claims, 3 Drawing Sheets

(56) References Cited

U.S. PATENT DOCUMENTS

| | | | |
|---|---|---|---|
| 5,825,880 A | 10/1998 | Sudia et al. | |
| 5,867,578 A | 2/1999 | Brickell et al. | |
| 5,892,824 A | 4/1999 | Beatson et al. | |
| 5,983,268 A | 11/1999 | Freivald et al. | |
| 3,064,751 A | 5/2000 | Smithies et al. | |
| 6,079,018 A * | 6/2000 | Hardy et al. | 713/170 |
| 6,097,811 A * | 8/2000 | Micali | 713/186 |
| 6,115,699 A * | 9/2000 | Hardjono | 705/51 |
| 6,167,518 A | 12/2000 | Padgett et al. | |
| 6,260,064 B1 | 7/2001 | Kurzrok | |
| 6,282,552 B1 | 8/2001 | Thompson et al. | |
| 6,285,999 B1 | 9/2001 | Page | |
| 6,334,131 B2 | 12/2001 | Chakrabarti et al. | |
| 6,356,924 B2 | 3/2002 | Mullen | |
| 6,367,012 B1 * | 4/2002 | Atkinson et al. | 713/176 |
| 6,378,075 B1 * | 4/2002 | Goldstein et al. | 705/64 |
| 6,381,344 B1 | 4/2002 | Smithies et al. | |
| 6,629,081 B1 * | 9/2003 | Cornelius et al. | 705/30 |
| 6,742,030 B1 | 5/2004 | MacPhail | |
| 6,760,752 B1 | 7/2004 | Liu et al. | |
| 6,816,871 B2 * | 11/2004 | Lee | 707/E17.005 |
| 6,871,191 B1 | 3/2005 | Kinney et al. | |
| 6,912,660 B1 * | 6/2005 | Petrogiannis | 713/181 |
| 7,013,323 B1 | 3/2006 | Thomas et al. | |
| 7,047,241 B1 | 5/2006 | Erickson | |
| 7,185,065 B1 | 2/2007 | Holtzman et al. | |
| 7,370,036 B2 | 5/2008 | Vedula | |
| 7,406,599 B1 | 7/2008 | Pravetz et al. | |
| 7,487,359 B2 * | 2/2009 | Peyravian et al. | 713/178 |
| 7,565,358 B2 | 7/2009 | Minogue et al. | |
| 7,610,233 B1 * | 10/2009 | Leong et al. | 705/37 |
| 7,630,986 B1 * | 12/2009 | Herz et al. | 709/217 |
| 7,765,396 B2 * | 7/2010 | Haufe | 713/155 |
| 8,224,826 B2 | 7/2012 | Minogue et al. | |
| 8,239,917 B2 * | 8/2012 | Hammond et al. | 726/1 |
| 8,296,293 B2 | 10/2012 | Minogue et al. | |
| 2001/0002485 A1 | 5/2001 | Bisbee et al. | |
| 2001/0018731 A1 * | 8/2001 | Fujii et al. | 711/170 |
| 2001/0018739 A1 * | 8/2001 | Anderson et al. | 713/176 |
| 2002/0052928 A1 | 5/2002 | Stern et al. | |
| 2002/0062368 A1 | 5/2002 | Holtzman et al. | |
| 2002/0073125 A1 * | 6/2002 | Bier | 707/530 |
| 2002/0124172 A1 | 9/2002 | Manahan | |
| 2002/0143755 A1 | 10/2002 | Wynblatt et al. | |
| 2002/0169865 A1 | 11/2002 | Tarnoff | |
| 2002/0184333 A1 | 12/2002 | Appelman | |
| 2003/0004766 A1 * | 1/2003 | Sandoval et al. | 705/7 |
| 2003/0009461 A1 | 1/2003 | Notargiacomo et al. | |
| 2003/0046351 A1 * | 3/2003 | Maruyama et al. | 709/206 |
| 2003/0046366 A1 | 3/2003 | Pardikar et al. | |
| 2003/0050919 A1 | 3/2003 | Brown et al. | |
| 2003/0051142 A1 | 3/2003 | Hidalgo et al. | |
| 2003/0070072 A1 | 4/2003 | Nassiri | |
| 2003/0115151 A1 | 6/2003 | Wheeler et al. | |
| 2003/0126245 A1 | 7/2003 | Feltin et al. | |
| 2003/0163597 A1 | 8/2003 | Hellman et al. | |
| 2003/0172120 A1 | 9/2003 | Tomkow et al. | |
| 2003/0182421 A1 | 9/2003 | Faybishenko et al. | |
| 2003/0212862 A1 | 11/2003 | James | |
| 2003/0217264 A1 * | 11/2003 | Martin et al. | 713/156 |
| 2003/0233345 A1 | 12/2003 | Perisic et al. | |
| 2004/0019546 A1 | 1/2004 | Ta et al. | |
| 2004/0041707 A1 * | 3/2004 | Hull et al. | 340/568.1 |
| 2004/0078750 A1 | 4/2004 | Frank | |
| 2004/0133797 A1 * | 7/2004 | Arnold | 713/200 |
| 2004/0181756 A1 * | 9/2004 | Berringer et al. | 715/530 |
| 2004/0205076 A1 | 10/2004 | Huang et al. | |
| 2004/0205513 A1 | 10/2004 | Chen et al. | |
| 2004/0255115 A1 | 12/2004 | DeMello et al. | |
| 2005/0033747 A1 | 2/2005 | Wittkotter | |
| 2005/0044197 A1 | 2/2005 | Lai | |
| 2005/0050066 A1 | 3/2005 | Hughes | |
| 2005/0060312 A1 | 3/2005 | Curtiss et al. | |
| 2005/0065924 A1 | 3/2005 | Silverbrook et al. | |
| 2005/0086260 A1 | 4/2005 | Canright et al. | |
| 2005/0160363 A1 | 7/2005 | Bhogal et al. | |
| 2005/0177389 A1 | 8/2005 | Rakowicz et al. | |
| 2005/0192958 A1 * | 9/2005 | Widjojo et al. | 707/5 |
| 2005/0210114 A1 | 9/2005 | Washburn | |
| 2005/0223002 A1 * | 10/2005 | Agarwal et al. | 707/7 |
| 2005/0251683 A1 * | 11/2005 | Levy et al. | 713/176 |
| 2005/0256866 A1 * | 11/2005 | Lu et al. | 707/5 |
| 2006/0004628 A1 | 1/2006 | Axe et al. | |
| 2006/0015488 A1 | 1/2006 | Perisic et al. | |
| 2006/0020596 A1 | 1/2006 | Liu et al. | |
| 2006/0020622 A1 * | 1/2006 | Shelton | 707/102 |
| 2006/0026123 A1 * | 2/2006 | Moore et al. | 707/2 |
| 2006/0026140 A1 | 2/2006 | King et al. | |
| 2006/0031235 A1 | 2/2006 | Foresti et al. | |
| 2006/0036599 A1 | 2/2006 | Glaser et al. | |
| 2006/0041516 A1 * | 2/2006 | Bogasky et al. | 705/76 |
| 2006/0047963 A1 * | 3/2006 | Brown et al. | 713/176 |
| 2006/0101269 A1 * | 5/2006 | Moskowitz et al. | 713/176 |
| 2006/0112105 A1 | 5/2006 | Adamic et al. | |
| 2006/0112165 A9 | 5/2006 | Tomkow et al. | |
| 2006/0135225 A1 * | 6/2006 | Lin et al. | 455/575.3 |
| 2006/0167784 A1 | 7/2006 | Hoffberg | |
| 2006/0168057 A1 | 7/2006 | Warren et al. | |
| 2006/0173867 A1 | 8/2006 | Gaucas et al. | |
| 2006/0179320 A1 * | 8/2006 | Berringer et al. | 713/180 |
| 2006/0184452 A1 | 8/2006 | Barnes et al. | |
| 2006/0212707 A1 | 9/2006 | Cahill et al. | |
| 2006/0235810 A1 | 10/2006 | Wen et al. | |
| 2006/0242026 A1 | 10/2006 | Crespo et al. | |
| 2006/0248076 A1 | 11/2006 | Troy et al. | |
| 2006/0253458 A1 * | 11/2006 | Dixon et al. | 707/10 |
| 2006/0294086 A1 * | 12/2006 | Rose et al. | 707/3 |
| 2006/0294134 A1 * | 12/2006 | Berkhim et al. | 707/102 |
| 2007/0027819 A1 | 2/2007 | Cowburn et al. | |
| 2007/0028107 A1 | 2/2007 | Cowburn et al. | |
| 2007/0038610 A1 * | 2/2007 | Omoigui | 707/3 |
| 2007/0050808 A1 * | 3/2007 | Matsuyama et al. | 725/31 |
| 2007/0078936 A1 | 4/2007 | Quinlan et al. | |
| 2007/0112761 A1 * | 5/2007 | Xu et al. | 707/5 |
| 2007/0124432 A1 | 5/2007 | Holtzman et al. | |
| 2007/0174247 A1 | 7/2007 | Xu et al. | |
| 2007/0174471 A1 | 7/2007 | Van | |
| 2007/0214096 A1 | 9/2007 | Newman et al. | |
| 2007/0294537 A1 * | 12/2007 | Peyravian et al. | 713/178 |
| 2008/0005064 A1 | 1/2008 | Sarukkai | |
| 2008/0052633 A1 | 2/2008 | Kubo et al. | |
| 2008/0114709 A1 * | 5/2008 | Dixon et al. | 715/808 |
| 2008/0307488 A1 * | 12/2008 | Hammond et al. | 726/1 |
| 2009/0100508 A1 | 4/2009 | Labaton | |
| 2009/0132814 A1 * | 5/2009 | Yoshioka | 713/161 |
| 2009/0254971 A1 * | 10/2009 | Herz et al. | 705/1 |
| 2010/0023370 A1 * | 1/2010 | Tivey et al. | 715/760 |
| 2010/0070448 A1 * | 3/2010 | Omoigui | 706/47 |
| 2010/0070510 A1 | 3/2010 | Agarwal et al. | |
| 2010/0241595 A1 | 9/2010 | Felsher | |
| 2010/0263057 A1 * | 10/2010 | Nguyen et al. | 726/27 |
| 2010/0317420 A1 * | 12/2010 | Hoffberg | 463/1 |
| 2011/0140857 A1 * | 6/2011 | Hull et al. | 340/10.1 |
| 2011/0289005 A1 * | 11/2011 | Walker et al. | 705/76 |
| 2012/0036127 A1 * | 2/2012 | Work et al. | 707/732 |
| 2012/0197804 A1 * | 8/2012 | Hind et al. | 705/50 |
| 2013/0097664 A1 * | 4/2013 | Herz et al. | 726/1 |

OTHER PUBLICATIONS

B. Gavish, J.H. Gerdes Jr., and J. Kalvenes—"Performance-Based Reward Distribution Methods for Anonymous Decision-Making Groups"—Group Decision and Negotiation Sep. 1, 2000, vol. 9, Issue 5, pp. 393-413.*

Bertino et al.—"Receipt Management Transaction History Based Trust Establishment" Cenas.purdue.edu 2002—ACM (pp. 1-13).

Kramer et al. "Analysis of Peer-to-Peer Network Security Using Gutella"—Department of Computer Science, cs.berkeley.edu, 2002 (pp. 1-20).

Notice of Allowance for U.S. Appl. No. 12/506,395 dated Nov. 28, 2011, 14 pages.

Chinese Office Action issued in 200680037368.9 on Mar. 19, 2012, 7 pages English Translation only.

(56) References Cited

OTHER PUBLICATIONS

Chinese Office Action issued in 200680037368.9 on Apr. 26, 2011, 8 pages, English Translation only.
Chinese Office Action issued in 200680037368.9 on Oct. 30, 2009, 7 pages, no translation.
European Office Action issued in 06800899.4 on Dec. 2, 2011, 4 pages.
Kathleen M Griffiths, and Helen Christensen—"Website Quality Indicators for Consumers"—J Med Internet Res. Oct.-Dec. 2005; (5): e55 Published online Nov. 15, 2005, doi: 1 0.2196/jmir.7.5.et55, Reviewed by Holly Witteman and Sasha Shepperd, PMCID: PMC1550688: http://www.ncbi.nlm.nih.gov/pmc/articles/PMC1550688/.
Liangzhao Zeng, Boualmen Benatallah, Anne H.H. Ngu, Marlon Dumas, Jayant Kalagnanam, and Henry Chang—"QoS-Aware Middleware for Web Services Composition" IEEE Transaction on Software Engineering, vol. 30, No. 5, May 2004—(pp. 311-327).
Office Action issued in U.S. Appl. No. 13/105,326 dated Nov. 7, 2011, 31 pages.
Notice of Allowance issued in U.S. Appl. No. 13/105,326 on Jun. 26, 2012, 21 pages.
Office Action issued in U.S. Appl. No. 12/506,395 on Sep. 20, 2010, 24 pages.
Office Action issued in U.S. Appl. No. 12/506,395 on Apr. 28, 2011, 21 pages.
Office Action issued in U.S. Appl. No. 11/200,406 on Oct. 9, 2007, 17 pages.
Office Action issued in U.S. Appl. No. 11/200,406 on May 13, 2008. 27 pages.
Office Action issued in U.S. Appl. No. 11/200,406 on Sep. 8, 2008, 22 pages.
Notice of Allowance issued in U.S. Appl. No. 11/200,406 on Feb. 25, 2009, 14 pages.
'XML-Signature Syntax and Processing', [online]. Bartel et al., 2002 [retrieved on May 24, 2006]. Retrieved from the Internet: <URL:www.w3.org/TR/xmldsig-core/>, 60 pages.
Lioy, et al., "Multiple Electronic Signatures on Multiple Documents" Proceedings of the 1st International workshop on electronic Government and Commerce: Design, Modeling, Analysis and Security, EGCDMAS 2004.
"How to Make Secure Email Easier to Use"—Garfinkel, David Margrave, Jeffrey I. Schiller, Erik Nordlander and Robert C. Miller—CHI ACM Apr. 2-7, 2005, pp. 1-11.
"Target dependent score normalization techniques and their application to signature verification" J. Fierrez-Aguilar, J. Orgega Garcia-Rodriguez—Systems, Many and Cybernetics, IEEE—Aug. 2005, pp. 418-425.
International Search Report and Written Opinion for International Application No. PCT/US2006/030754, mailoed Nov. 17, 2006, 15 pages.
International Preliminary Report on Patentability for International Application No. PCT/US2006/030754, mailed Feb. 21, 2008, 7 pages.
Yufeng, W., and Nakao, A., "Poisonedwater: An Improved Approach for ACcuragte Reputation Ranking in P2P Networks," Future Generation Computer Systems 26(2010) 1317-1326.
Ziegler, C.-N., Lausen, G., "Propogation Models for Trust and Distrust in Social Networks," Information Systems Frontiers, 7:4/5, 337-358, 2005.
Ziegler, Cai-Nicholas, "Chapter 6: On Propogating Interpersonal Trust in Social Networks," Computing with Social Trust, Human-Computer Interactions Series, J. Golbeck, ed., Springer-Verlag, London, 2009, pp. 133-168.
"DiSigncryption: An Integrated of Agent-based Signature Delegation with Distributed Reputation Management Scheme"—P. Bamasak, N. Zhang and D. Edwards—IEEE Apr. 2005, pp. 1-8.

\* cited by examiner ically related to the query. An
AGENT RANK

CROSS-REFERENCE TO RELATED APPLICATIONS

This application is a continuation application of U.S. patent application Ser. No. 13/105,326, filed May 11, 2011 now U.S. Pat. No. 8,296,293, which is a continuation U.S. patent application Ser. No. 12/506,395, filed Jul. 21, 2009, now U.S. Pat. No. 8,224,826 B2 which is a continuation of U.S. patent application Ser. No. 11/200,406, filed on Aug. 8, 2005, now U.S. Pat. No. 7,565,358 B2 all of which are incorporated herein by reference in their entirety.

TECHNICAL FIELD

This invention relates to the searching and ranking of linked information sources.

BACKGROUND

Information Retrieval (IR) is concerned with locating desired elements of information among a large corpus. A search engine is a one example of an IR system that enables documents (usually but not necessarily limited to text) to be retrieved from a large corpus on the basis of their degree of relevance with respect to a compact query presented by a user. The order in which documents are retrieved or presented is the ranking created by the search engine: the highest ranked documents, with respect to the query, are returned or presented first. Search engine ranking may be affected by both query-dependent and query-independent criteria. Query-dependent criteria generally attempt to identify the degree to which a document is semantically related to the query. An example is the correspondence of word frequency distributions. Query-independent criteria often seek to identify the degree to which a document is generally "good", e.g. authoritative, intelligible, not fraudulent or not deceptive. An example of a query-independent criterion is the score computed by the PageRank algorithm, or similar algorithms that examine the link structure of a corpus of documents.

As mentioned above, query-independent criteria can provide a way of measuring the authoritativeness of a specific information source. For example, the more information sources that point to a specific information source, the higher the search rating score the information source gets, and the more authoritative it is judged to be. In some instances, the search rating algorithm is recursive, meaning that a information source's search rating score is based not only on the number of information sources that reference the original information source, but also on the search rating scores of the referencing information sources. In other words, the search rating score of an information source is based on both the number and quality of the referencing information sources.

For some information sources, all of the content is under the control of a single agent. In such cases, the reputation of the agent can be directly correlated with the content of the information source. In other cases, however, control may be delegated among several agents, each controlling a partition of the information source. To the extent that these partitions can be identified, agent reputation can be calculated at the partition level.

In general, however, it is difficult to correlate content on an information source with the agents responsible for creating or publishing that content. For example, an individual author may contribute content to multiple information sources, content within a single information source may originate from multiple agents, or ownership and control of information sources may change over time. As another example, a single web page can contain content controlled by multiple agents, such as advertisements which appear alongside news articles.

SUMMARY

The present invention provides methods and apparatus, including computer program products, implementing techniques for searching and ranking linked information sources.

In one aspect, the techniques include receiving multiple content items from a corpus of content items; receiving digital signatures each made by one of multiple agents, each digital signature associating one of the agents with one or more of the content items; and assigning a score to a first agent of the multiple agents, wherein the score is based upon the content items associated with the first agent by the digital signatures.

Implementations of the invention can include one or more of the following features. The techniques may further include determining the validity of the digital signatures. If no digital signature associates an agent with a specific content item, the content item is associated with an owner of a location where the specific content is found and a score is assigned to the owner based on the specific content item. The content items associated with the first agent include a content item that contains a digital signature associating the first agent with the content item. The content items associated with the first agent include a content item that includes a link to a digital signature associating the first agent with the content item. The content items associated with the first agent include a content item that is a web site or a portion of the web site. A second agent is associated by a second digital signature with a second content item with which the first agent is associated, and the second agent makes an assertion about the content item. The first agent makes an assertion with a digital signature that the first agent is an author of the second content item. The second agent makes an assertion with the second digital signature that the second agent is a reviewer of the second content item. The second agent makes an assertion with the second digital signature that the second agent is an editor of the second content item. The second agent makes an assertion with the second digital signature that the second agent is a publisher of the second content item. Assigning a score to the first agent can include assigning the score based on unsigned content items that the first agent is associated with as an owner of one or more locations where the unsigned content items are found. Assigning a score to the first agent can include assigning the score based on one or more assertions made by one or more other agents about content items associated with the first agent. Assigning a score to the first agent can include assigning the score based on one or more assertions made by the first agent. The score is used in ordering results of a search of the corpus.

Particular embodiments of the invention can be implemented to realize one or more of the following advantages. The identity of individual agents responsible for content can be used to influence search ratings. The identity of agents can be reliably associated with content. The granularity of association can be smaller than an entire web page, so that agents can disassociate themselves from information appearing in proximity to information for which the agent is responsible. An agent can disclaim association with portions of content, such as advertising, that appear on the agent's web site. The same agent identity can be attached to content at multiple locations. Multiple agents can make contributions to a single web page where each agent is only associated to the content that the agent provided.

Query-independent rankings of content and authors can be calculated. A query-independent ranking can be, but need not be, calculated offline, prior to accepting a user query of the content, and then used to calculate a query-dependent ranking used for presentation of results. An algorithm used for calculating a query-independent ranking could also be used within the context of a specific query, with minimal modification, to calculate a ranking specific to that query. For example, the corpus can be limited to the query-relevant content.

Particular embodiments implement techniques for computing agent ranks on the basis of a corpus of content signed by those agents, where the corpus optionally contains explicit links among documents and signed content. The agent ranks can optionally also be calculated relative to search terms or categories of search terms. For example, search terms (or structured collections of search terms, i.e., queries) can be classified into topics, e.g., sports or medical specialties, and an agent can have a different rank with respect to each topic.

One implementation of the invention provides all of the above advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
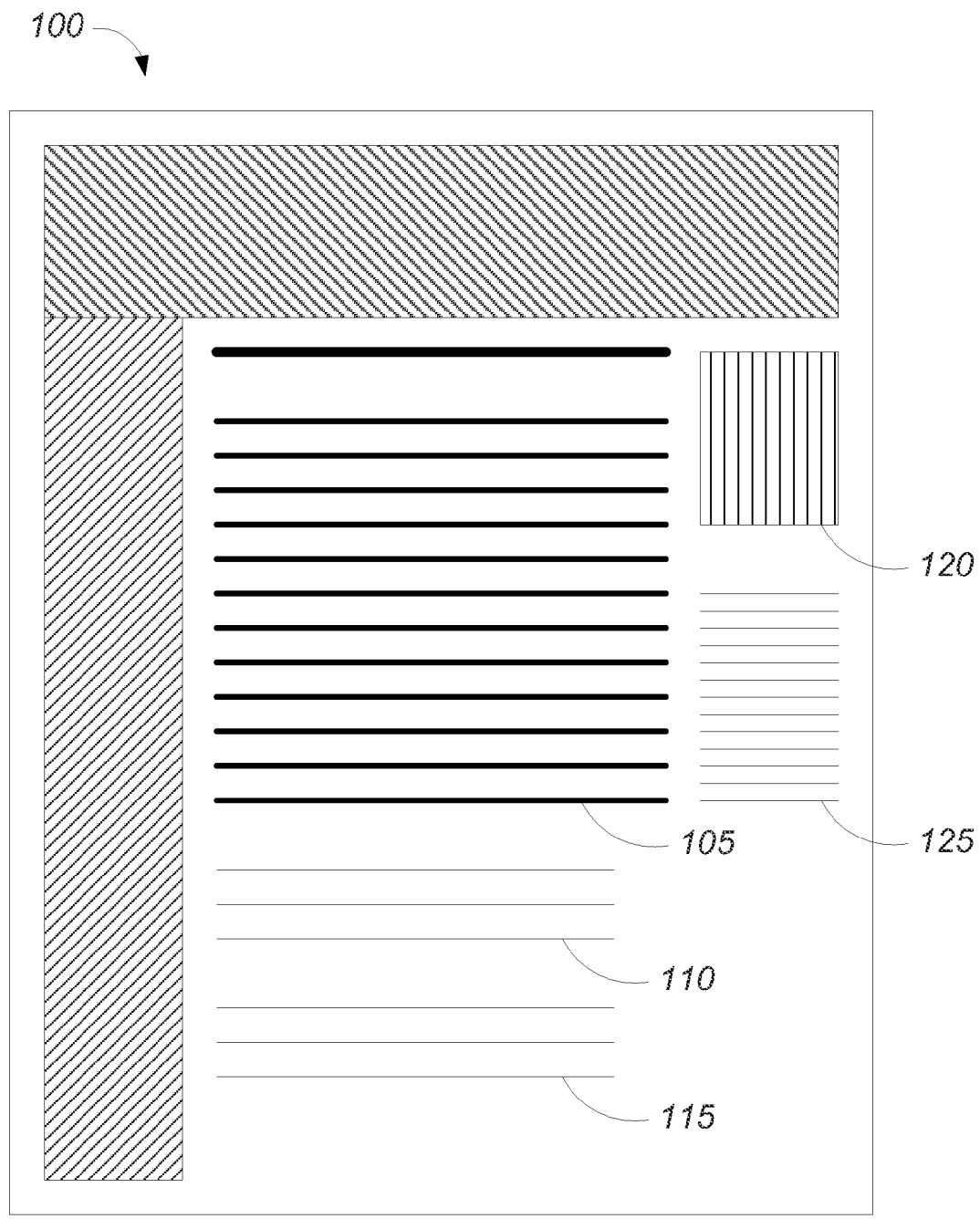
FIG. 1 is a schematic representation of a web page.

FIG. 1 shows a mock-up of a sample web page 100. The web page 100 can include various content pieces, including main body text 105, comments 110, 115, image 120, and advertising 125. Each of these content pieces can be created by a different agent. For example, in one implementation, the main body text 105 is created by the owner of the web page 100, the comment 110 is authored by a first agent of the web page 100, and comment 115 is authored by a second agent of the web page 100. An agent is any individual or entity that either provides content pieces, edits existing content pieces, or reviews existing content pieces on a web page. An owner of a web page is the agent that has ultimate control over the web page, including control over all of the content pieces of the web page, including content pieces provided by other agents. Agents that are not owners generally have limited control over content pieces on the web page. For example, in one implementation, a non-owner agent can place a comment on the web page, but not edit or delete the comments of other agents that are included within the web page.

In an alternative implementation, the comment 110 is authored by the first agent of the web page 100, and the comment 115 is authored by the owner of the web page 100. The advertising 125 can be provided by a third-party advertising service, and the contents of the advertising may or may not be under the control of the owner of the web page 100. In other words, even though the web page 100 may be owned by a single agent, it is possible for content pieces within the web page 100 to have been created or supplied by agents other than the owner of the web page 100.

Each content piece can be signed with a digital signature, either directly by the agent or indirectly on behalf of the agent. The digital signature identifies the agent that actually created each content piece on the web page 100. In one implementation, each individual content piece on a web page is signed separately. In an alternative implementation, one or more content pieces on a web page is signed while other content pieces on the same web page remain unsigned. In another implementation, a digest or hash of the content piece or content pieces can be generated, and the digest or hash of the content piece is signed. Any suitable protocol for creating and validating digital signatures can be used, e.g., XML Digital Signatures. Additional information about XML Digital Signatures may be found in the XML-Signature Syntax and Processing Recommendation of Feb. 12, 2002, available from the World Wide Web Consortium (W3C) at http://www.w3.org/TR/xmldsig-core/ and incorporated here by reference.

The agent signing each content piece can claim various roles relative to the content, e.g., author, publisher, editor, or reviewer. The signature provides evidence that a particular agent has asserted its role with respect to the signed content piece, as the agent has exclusive access to the private key used to sign the content piece. In one implementation, the digital signature can include within the scope of the content signed other metadata such as creation date, review score, or recommended keywords for search.

In one implementation, agents have the ability to sign a subset of a web page, and exclude content for which the agent does not claim any responsibility. For example, an agent can sign a document while excluding any ads which are being served alongside the document. Signatures can be applied to anything from an individual hyperlink to an entire document. Signatures can also be applied to text, images, audio, video, or any other digital content. The signature allows anyone to verify that the content that is signed has not been materially altered since the signature was generated.

Signatures can be portable or fixed to a particular web page or uniform resource locator (URL). For example, a syndicated columnist may wish to sign a column once upon creation, and have the signature follow the document wherever it is published. In other cases, the agent signing the content may wish to prevent their reputation from being used to draw traffic to sites they do not control. In either instance, the metadata associated with the digital signature can indicate whether or not the reputation associated with the signing agent is portable or not. For example, in one implementation, the signature is linked to the URL of the site where the content is located by including the URL as metadata within the signed content.

In one implementation, multiple agents can sign content on a single web page. For example, a message board or web log can allow each post to be signed by its respective author. In an alternative implementation, unsigned content pieces can be attributed to a synthetic agency identified by the host, site, or URL on which the content piece appears. In another implementation, a single agent that controls multiple websites can sign the content on each of the multiple website, indicating that the single agent is responsible for the content on all of the multiple websites.

Each digital signature is tied to the content piece that is signed. In one implementation, the digital signature can be appended to the content piece, or otherwise located in immediate proximity to the content piece. In another implementation, the content piece can contain a link to the digital signature, e.g., a uniform resource identifier (URI) identifying the digital signature. In yet another implementation, the digital signature is located in a central file or directory separate from the content piece, and some portion or all of the content piece covered by the digital signature is the target of a link from the central file or directory. In any of these implementations, the digital signature can be used to verify that the content piece has not been modified since the content piece was signed by the agent.

The digital signatures can be used to influence the ranking of web search results by indicating the agent responsible for a particular content piece. In one implementation, the reputation for an agent is expressed as a numerical score. A high reputational score indicates that the agent has an established positive reputation. The reputational scores of two or more agents can be compared, and the agent having the higher reputational score can be considered to be more authoritative. In an alternative implementation, multiple scores can be computed for different contexts. For example, an agent might have a first score for content that the agent has written, and a second score for content that the agent has reviewed. In another example, an agent that is responsible for an entertainment magazine could have a high reputation score for content related to celebrity news, but a low reputation score for content related to professional medical advice.

Assuming that a given agent has a high reputational score, representing an established reputation for authoring valuable content, then additional content authored and signed by that agent will be promoted relative to unsigned content or content from less reputable agents in search results. Similarly, if the signer has a large reputational score due to the agent having an established reputation for providing accurate reviews, the rank of the referenced content can be raised accordingly.

A high reputational score need not give an agent the ability to manipulate web search rankings. In one implementation, reputational scores are relatively difficult to increase and relatively easy to decrease, creating a disincentive for an agent to place its reputation at risk by endorsing content inappropriately. Since the signatures of reputable agents can be used to promote the ranking of signed content in web search results, agents have a powerful incentive to establish and maintain a good reputational score.

In one implementation, an agent's reputation can be derived using a relative ranking algorithm, e.g., Google's PageRank as set forth in U.S. Pat. No. 6,285,999, based on the content bearing the agent's signature. Using such an algorithm, an agent's reputation can be determined from the extrinsic relationships between agents as well as content. Intuitively, an agent should have a higher reputational score, regardless of the content signed by the agent, if the content signed by the agent is frequently referenced by other agents or content. Not all references, however, are necessarily of equal significance. For example, a reference by another agent with a high reputational score is of greater significance than a reference by another agent with a low reputational score. Thus, the reputation of a particular agent, and therefore the reputational score assigned to the particular agent, should depend not just on the number of references to the content signed by the particular agent, but on the importance of the referring documents and other agents. This implies a recursive definition: the reputation of a particular agent is a function of the reputation of the content and agents which refer to it.

In this manner, the reputation of a particular agent can be calculated by an iterative procedure on a linked database. A linked database (i.e. any database of documents containing mutual citations, such as the world wide web or other hypermedia archive, a dictionary or thesaurus, and a database of academic articles, patents, or court cases) can be represented as a directed graph of N nodes, where each node corresponds to an agent along with all of the content pieces associated with that agent, and where the directed connections between nodes correspond to links from a content piece of one agent to a content piece of another agent. A given node has a set of forward links that connect it to children nodes, and a set of backward links that connect it to parent nodes.

Figure 3:
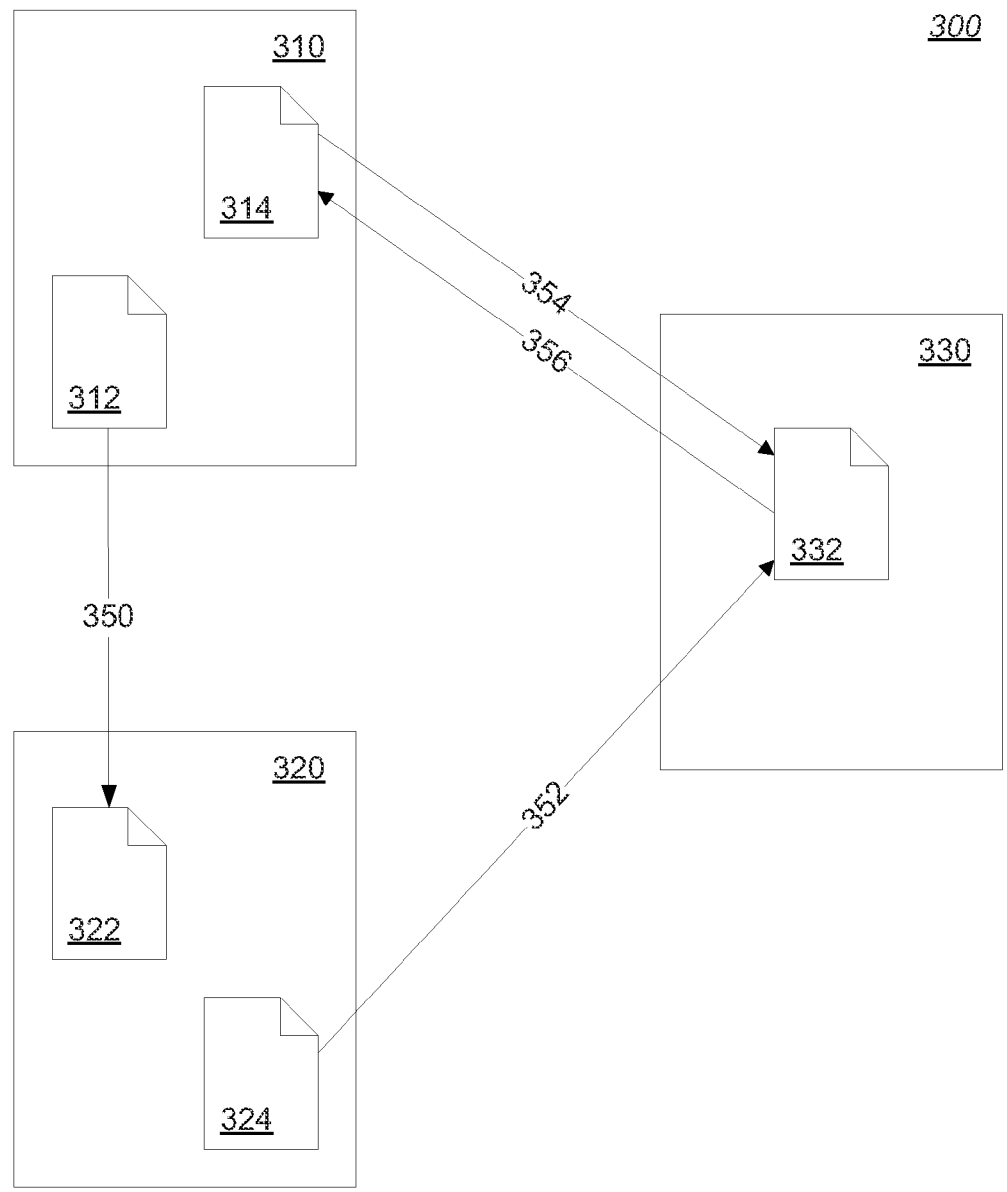
FIG. 3 illustrates a linked database.

FIG. 3 illustrates a linked database 300. A first agent 310 is associated with content pieces 312, 314, a second agent 320 is associated with content pieces 322, 324, and a third agent is associated with content piece 332. Content piece 312 associated with the first agent 310 is linked (350) to content piece 322 associated with the second agent 320, and content piece 324 associated with the second agent 320 is linked (352) to content piece 332 associated with the third agent 330. Content piece 314 associated with the first agent 310 is linked (354) to content piece 332 associated with the third agent 330, in addition to content piece 332 being linked (356) back to content piece 314.

In this implementation, the rank of a particular agent A, r(A), is calculated as follows:

$$r(A) = \frac{\alpha}{N} + (1 - \alpha)\left(\frac{r(B_1)}{|B_1|} + \ldots + \frac{r(B_n)}{|B_n|}\right),$$

where $B_1, \ldots, B_n$ are the agents that link to A, $r(B_1), \ldots, r(B_n)$ are their ranks, $|B_1|, \ldots, |B_n|$ are the number of forward links in content signed by the agent, $\alpha$ is a constant in the interval [0,1], and N is the total number of agents in the database. The constant $\alpha$ is interpreted as the probability that a user will jump randomly to any content piece instead of following a forward link.

In an alternative implementation, a seed group of trusted agents can be pre-selected, and the agents within this seed group can endorse other content. Agents whose content receives consistently strong endorsements can gain reputation. In either implementation, the agent's reputation ultimately depends on the quality of the content which they sign.

In another implementation, a set of trusted signing authorities can make additional assertions such as establishing the time when content was signed. This would allow priority to be determined if two agents attempted to sign similar content.

The use of digital signatures permits the reputation system to link reputations with individual agents, and adjust the relative rankings based on all of the content each agent chooses to associate itself with, no matter the location of the content. For example, the content can be located across multiple websites, or mixed with the content of other agents on a single website. In another implementation, the content can include any sort of digital content, e.g., e-mail, CD-ROMs, or DVDs, and the content need not be located on the Internet. In addition, although the use of digital signatures permits signed content to be associated with a specific agent, it is not necessary to know the actual identity of the agent. Although each agent uses a private key unique to the agent to create each signature, no personal information about the agent is necessary for the signature to be created or for the signature to be used by others. In one implementation, the agent can revoke or otherwise invalidate the private key if the private key is compromised. Once the private key is revoked, the signatures created using the revoked private key will not be accepted as valid, and will not be used to link the agent with the content signed with the revoked private key.

Figure 2:
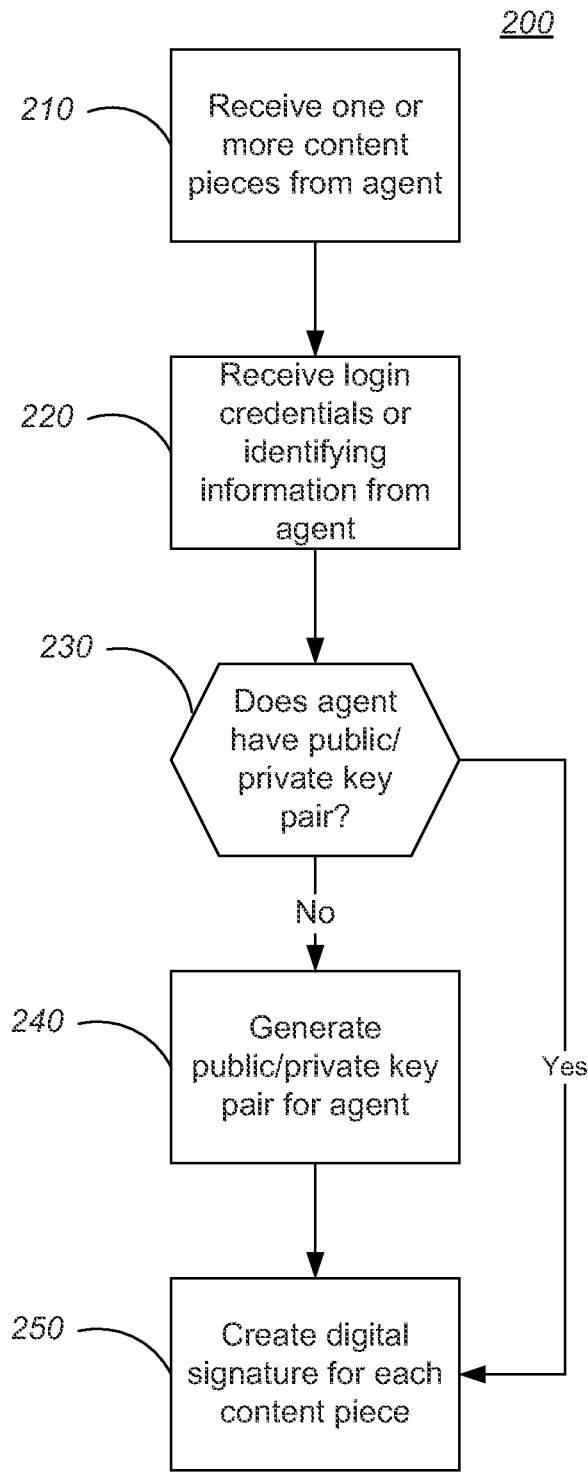
FIG. 2 is a flow chart of a method for generating and managing the public and private keys necessary to generate signatures.

FIG. 2 shows the use of a content authoring tool to generate and manage the public and private keys necessary to generate signatures. The content authoring tool receives one or more content pieces from an agent (step 210). The content pieces can include text, images, audio, video, or any other static digital content. The content pieces can represent an entire web site, an individual web page, or individual components of a web page. The content authoring tool then receives login credentials or other identifying information from the agent (step 220). The login credentials or other identifying information uniquely identify the agent. In one implementation, personal information can be associated with the login credentials or other identifying information, e.g., billing information. In an alternative implementation, no personal information is associated with the login credentials or other identifying information.

Next, the content authoring tool determines if the agent already has a public/private key pair for generating digital signatures (step 230). If the agent does not have a public/private key pair, a key pair is generated for use by the agent (step 240). In one implementation, the key pair is generated by an authentication service upon the request of the content authoring tool. In either case, the private key associated with the agent is used to create a digital signature for each of the content pieces (step 250). In one implementation, various metadata can be associated with the digital signature, such as a timestamp indicating the time and date that the digital signature was created, keywords relating to the content piece, or the URL of the website where the content piece is located. In one implementation, the metadata is appended to the content piece, and the content piece containing the metadata is digitally signed.

In one implementation, the content authoring tool can also be used to determine if the signature associated with a content piece is valid, and identify the agent that signed the content piece in question. Alternatively, any interested entity can use the public key portion of the public/private key pair to determine if the signature associated with a content piece is valid, and identify the agent that signed the content piece in question.

In another implementation, the content authoring tool can be used by an agent acting in an editorial or reviewing role to digitally sign a content piece as having been edited or reviewed. The process is similar to that shown in FIG. 2 and described above, with the addition that the digital signature created for each content piece includes metadata indicating that the agent edited or reviewed the digitally signed content piece. In one implementation, the metadata can also include a listing of edits performed or review score.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device or in a machine-readable propagated electromagnetic signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, actions recited in the method claims can be performed in different orders and still achieve desirable results.

What is claimed is:

1. A computer-implemented method comprising:
    determining, by one or more computers, that a first agent and a second agent have each applied a respective digital signature to a same item of content at different times, wherein the first agent and the second agent are not included in a pre-selected group of trusted agents, and wherein each digital signature asserts a respective role of the first agent or the second agent with respect to the item of content;
    determining, by one or more computers, that a third agent that is included in the pre-selected group of trusted agents has endorsed the time when the first agent or the second agent signed the content by applying their respective digital signature to the item of content; and
    determining, by one or more computers, a priority between the first agent and second agent based on the time that is endorsed by the third agent.

2. The method of claim 1, wherein each agent is a person that makes an assertion concerning the item of content.

3. The method of claim 1, comprising adjusting a reputation score associated with the first agent or the second agent based on the endorsement of the third agent.

4. The method of claim 1, comprising pre-selecting the seed group of trusted agents based on one or more criteria.

5. The method of claim 1, comprising identifying the first agent or the second agent as a maker of the item of content.

6. A non-transitory computer-readable storage device storing software comprising instructions executable by one or more computers which, upon such execution, cause the one or more computers to perform operations comprising:
    determining that a first agent and a second agent have each applied a respective digital signature to a same item of content at different times, wherein the first agent and the second agent are not included in a pre-selected group of trusted agents, and wherein each digital signature asserts a respective role of the first agent or the second agent with respect to the item of content;
    determining that a third agent that is included in the pre-selected group of trusted agents has endorsed the time when the first agent or the second agent signed the content by applying their respective digital signature to the item of content; and
    determining a priority between the first agent and second agent based on the time that is endorsed by the third agent.

7. The device of claim 6, wherein each agent is a person that makes an assertion concerning the item of content.

8. The device of claim 6, wherein the operations comprise adjusting a reputation score associated with the first agent or the second agent based on the endorsement of the third agent.

9. The device of claim 6, wherein the operations comprise pre-selecting the seed group of trusted agents based on one or more criteria.

10. The device of claim 6, wherein the operations comprise identifying the first agent or the second agent as a maker of the item of content.

11. A system comprising:
    one or more computers; and
    a computer-readable medium tangibly embodying a computer program product comprising instructions to cause the one or more computers to perform operations comprising:
    determining that a first agent and a second agent have each applied a respective digital signature to a same item of content at different times, wherein the first agent and the second agent are not included in a pre-selected group of trusted agents, and wherein each digital signature asserts a respective role of the first agent or the second agent with respect to the item of content;
    determining that a third agent that is included in the pre-selected group of trusted agents has endorsed the time when the first agent or the second agent signed the content by applying their respective digital signature to the item of content; and
    determining a priority between the first agent and second agent based on the time that is endorsed by the third agent.

12. The system of claim 11, wherein each agent is a person that makes an assertion concerning the item of content.

13. The system of claim 11, wherein the operations comprise adjusting a reputation score associated with the first agent or the second agent based on the endorsement of the third agent.

14. The system of claim 11, wherein the operations comprise pre-selecting the seed group of trusted agents based on one or more criteria.

15. The system of claim 11, wherein the operations comprise identifying the first agent or the second agent as a maker of the item of content.

16. A computer-implemented method comprising:
    determining, by one or more computers, that a first agent and a second agent have each applied a respective digital signature to a same item of content at different times, wherein the first agent and the second agent are not included in a group of trusted agents, and wherein:
        the digital signature of the first agent comprises an authorship assertion that the first agent authored the item of content, and
        the digital signature of the second agent comprises an authorship assertion that the second agent authored the item of content;
    determining, by one or more computers, that a third agent that is included in the group of trusted agents has endorsed the time when the first agent or the second agent signed the content by applying their respective digital signature to the item of content; and
    determining, by one or more computers, a priority between a time the authorship assertion of the first agent was made and a time the authorship assertion of the second agent was made.

17. The method of claim 16, wherein determining the priority between the time the authorship assertion of the first agent was made and the time the authorship assertion of the second agent was made comprises determining a priority that indicates which agent created the item of content.

* * * * *